Figure 1:
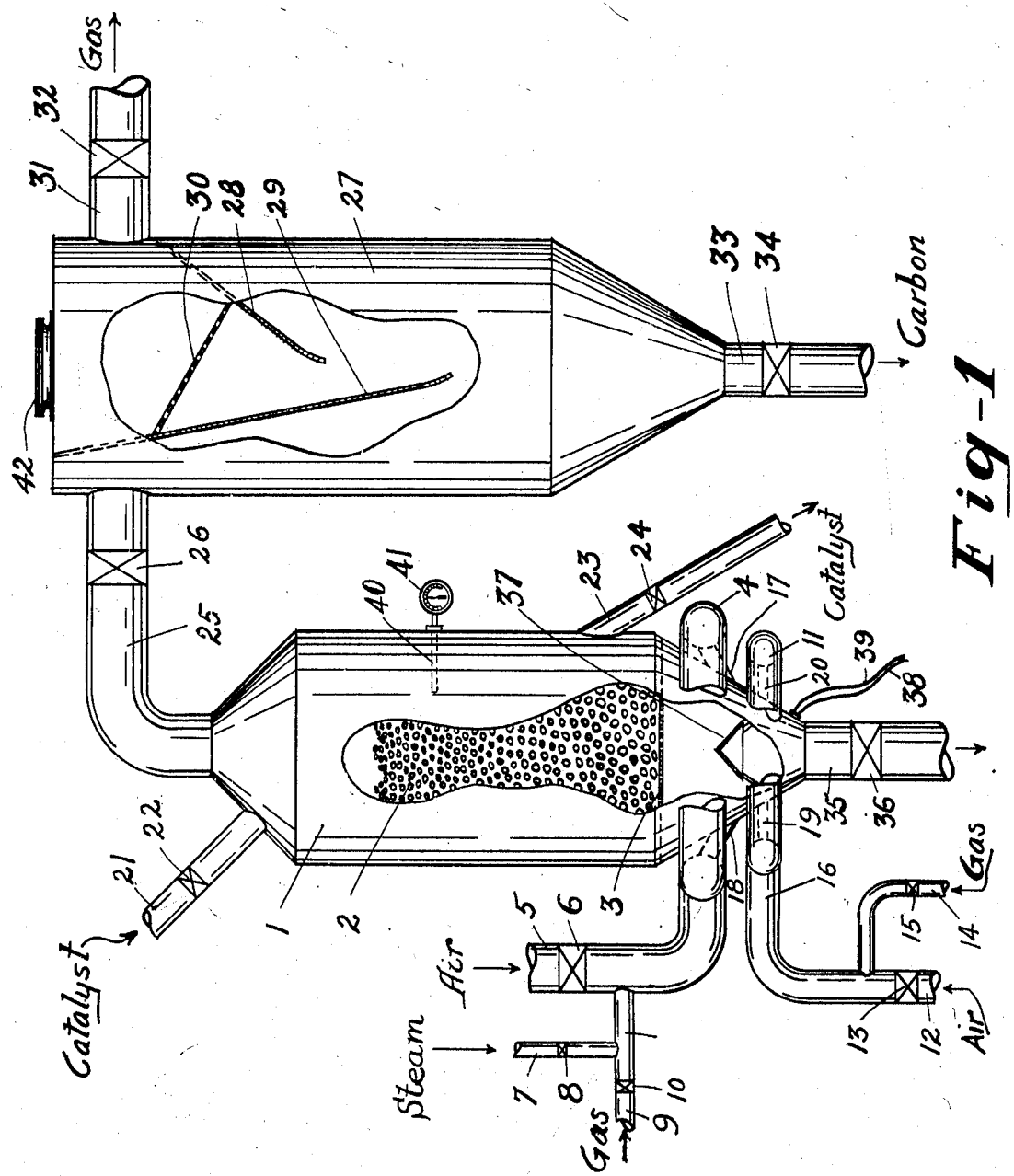

July 3, 1934.  W. W. ODELL  1,964,744

PROCESS OF MAKING CARBON BLACK

Filed Feb. 20, 1930

William W. Odell
INVENTOR

BY William W. Odell
ATTORNEY

Patented July 3, 1934

1,964,744

UNITED STATES PATENT OFFICE 1,964,744

PROCESS OF MAKING CARBON BLACK

William W. Odell, Chicago, Ill.

Application February 20, 1930, Serial No. 430,100

7 Claims. (Cl. 134—60)

My invention, which is continuation in part of my application Serial No. 414,710 filed Dec. 17, 1929, for a process of treating materials, relates largely to the production of gas comprising or containing carbon monoxide from various fuels and the subsequent conversion of the carbon monoxide to carbon black and carbon dioxide. It has to do with the wide variation in the equilibrium in the system $2CO=C+CO_2$ over a range of temperature of 100° to 1300° centigrade, and it embraces the control of factors influencing the attainment of an equilibrium condition favorable for the reaction to occur with the formation of carbon black.

The objects of my invention are:

1. To produce carbon black from an oxide of carbon.
2. Use coal, coke, hydro-carbons or other fuel in the production of carbon black by the generation of carbon monoxide.
3. To recover carbon dioxide in the production of carbon black from fuel.
4. Provide a flexibility to gas generating processes whereby carbon black and $CO_2$ or combustible gas is the objective of processing.
5. Make available for immediate use, large quantities of fuels that are now wasted, by conversion to carbon and carbon dioxide. Such fuels include, solid fuels and also liquid and gaseous fuels. The solid fuels include mine waste, coke fines, coal lost in washing processes and the like. Of the gaseous fuels commonly wasted is included, still gases, refinery gases, natural gas, gases recovered from natural gas, propane, butane, ethane, and other combustible gases. Blast furnace gas is also a satisfactory fuel.

In the production of carbon black by processes now in common use, two different, general types of reactions are employed, that is, there are two distinct processes. One process comprises burning natural gas, composed chiefly of methane and ethane, with an insufficient supply of air for its complete combustion, and cooling the products of incomplete combustion in contact with a metal surface; the finely divided particles of carbon formed by the incomplete combustion are largely deposited on the metal surface. In that process the luminous flame is allowed to play against a cooling surface; the burning gases are cooled below their ignition temperatures by the contact with the cooled surface and thus the particles of carbon liberated by pyrolysis of hydrocarbon gas are also cooled and their combustion is arrested. Large volumes of hydrocarbon gas are used in this manner in obtaining a very small percentage yield of carbon. It is common practice to recover somewhat less than 1.5 pounds of carbon per 1,000 cubic feet of natural gas used. The thermal efficiency, with this yield, and using natural gas having a calorific value of 1100 B. t. u. per cubic foot, is about 2.0 per cent. The carbon recovered is approximately 4.25 per cent of the total carbon in the gas used. Obviously this process does not permit operation at high efficiencies; it is, hereinafter referred to as the "combustion process".

In recognition of the demerits of the combustion process numerous attempts have been made by various investigators, to increase efficiencies by cracking the hydrocarbons by the action of heat, that is by passing them into contact with highly heated refractory surfaces. This method of producing carbon has the advantage of increased yield of carbon and higher efficiency. However, the quality of the carbon as regards its use in certain industries is inferior to that made by the combustion process. Apparently, the reason for this is that tarry matter forms which causes some agglomeration of particles. It is my observation that attempts made to improve the quality of the carbon made by the pyrolysis of hydrocarbons results in a decrease in the yield of carbon per unit volume of gas used.

Apparently there is much yet unknown regarding the molecular changes that occur in the formation of carbon black, but it is quite evident that the properties of the carbon are materially influenced by numerous variable factors which are more or less under control during operation as well as upon some that are not readily controlled. These factors in the combustion process include:

(a) Temperature of the primary and secondary air.

(b) Moisture content of the gas, and of the primary and secondary air.

(c) Air: gas ratio in the combustible mixture at burner ports.

(d) Shape and size of flame.

(e) Velocity of flow of air-gas mixture through burner ports.

(f) Composition of the hydrocarbon gas used.

(g) Pressure under which the gas is burned.

(h) To a limited extent, the nature of the surface contacted by the flame.

In commercial practice, many of the above variables have been varied for the purpose of studying the effect thereby produced but, so far as I am aware, the best yield of high grade carbon black thus obtained is about 1.5 pounds per 1000 cubic feet of gas used. Furthermore, even at the low efficiency it has not heretofore been possible, so far as I am aware, to make the same good quality of carbon black from the higher hydrocarbons, propane, butane, natural gasoline gas, still gas from hydrocarbon refineries (petroleum refineries), ethylene, propylene or from aromatic oils and gases such as creosote oil, benzene and similar compounds. I find that I can accomplish this result from such materials by first reforming them, making carbon monoxide and hydrogen and then converting the carbon monoxide into carbon and carbon dioxide. For the purpose of clearness, I prefer to present equations which indicate the results I obtain; representative equations are as follows:

(1) $CH_4 + H_2O = CO + 3H_2$ (Endothermic)

(2) $C_3H_8 + 3H_2O = 3CO + 7H_2$ (Endothermic)

(3) $C_4H_{10} + 4H_2O = 4CO + 9H_2$ (Endothermic)

(4) $C_nH_{(2n+2)} + nH_2O = nCO + (2n+1)H_2$ (Endothermic)

(5) $CH_4 + 2H_2O + C = 2CO + 4H_2$ (Endothermic)

(6) $C_3H_8 + 4H_2O + C = 4CO + 8H_2$ (Endothermic)

(7) $C_nH_{(2n+2)} + (n+1)H_2O + C = (n+1)CO + (2n+2)H_2$ (Endothermic)

(8) $C_6H_6 + 6H_2O = 6CO + 9H_2$ (Endothermic)

(9) $C_2H_4 + 2H_2O = 2CO + 4H_2$ (Endothermic)

(10) $C_nH_{2n} + nH_2O = nCO + 2nH_2$ (Endothermic)

(11) $2CO = C + CO_2 + 70,000$ B. t. u. per pound mol.

(12) $2CO + 4H_2 = C + CO_2 + 4H_2$ (Exothermic)

(13) $C + H_2O = CO + H_2$ (Endothermic)

It will be noted that by reaction with steam, hydrocarbons yield, at high temperature, a gas comprised essentially of CO and $H_2$. Equations 1 to 4 show that the ratio of two volumes hydrogen to one volume of carbon monoxide is approached but not equaled as paraffins of increasing molecular weight are used. By the use of additional steam and carbon the paraffins can be reformed to gas comprising $2H_2 + CO$, as shown by Equations 5, 6 and 7. This is accomplished by causing the hydrocarbons and steam to be introduced into a bed of solid fuel heated to a temperature above 1800° F. By passing straight steam through the fuel bed, water gas is made, hence by the proper combination of reactions—by the regulation of the proportional amounts of steam and hydrocarbon used—the $H_2$ to CO ratio can be varied from 1 to 1 to more than 2 to 1. Using olefines the limiting ratios are substantially 1 to 1, to approximately 2 to 1, when all of the carbon of the olefines used is converted into carbon monoxide.

The end sought in my process is indicated by the reversible reaction shown in Equation 11, left to right. I employ either straight carbon monoxide gas, preferably with some water vapor present, or producer gas, water gas or reformed gas similar to that shown in the equations, or other gas containing appreciable amounts of carbon monoxide. The reaction for the conversion of CO into C and $CO_2$ is carried out in my process by the aid of a catalyst such as iron, iron oxide, iron containing manganese, copper or other metal, or a metal oxide which may readily be reduced. Although the activities of all of the different catalysts are not alike, and although I usually prefer to use iron, or iron containing appreciable amounts of manganese, copper or both, nevertheless it is apparent that other catalysts known to function in reactions of similar nature will probably catalyze this reaction to a greater or less degree and therefore I do not limit myself to the use of iron. When producing carbon for certain uses the catalysis is advantageously promoted by using zinc or an oxidized product of zinc alone or in conjunction with iron, employing temperatures in the catalyst mass during reaction adapted to give the optimum production. Zinc melts at about 419.5° C. and when using it in the solid phase it is necessary to operate at temperatures below this limit. Alloyed with copper a higher temperature can be used.

Although the activity of a given catalyst varies with the temperature, so does the chemical equilibrium. With reference to Equation 11, there is only one equilibrium condition to consider, but when both carbon monoxide and hydrogen are caused to contact a heated catalyst such as iron, there is another reaction to consider, namely,

(14) $CO_2 + H_2 = CO + H_2O$

Now, referring to Equation 11, I find that the amount of $CO_2$ present at 1350° F. and at equilibrium is about 14.0 percent, the remainder being CO whereas at 940° F. the equilibrium gas comprises approximately 13.6 percent of CO and 86.4 percent of $CO_2$ whereas at about 660° F. and lower temperatures the reaction is substantially completely to $CO_2$, at equilibrium. Normally I prefer to operate at a temperature above 300° F. and below 940° F. The rate at which equilibrium is attained within the temperature range 300° to 940° F. is not the same for all catalysts; it is very high using iron as catalyst.

Considerable heat is evolved in the reaction shown in Equation 11, which necessitates the cooling of the catalyst during processing or a circulation of the catalyst. Diluting the gas—the carbon monoxide—with inert or other gas before causing catalytic reaction is one method of accomplishing the result. In fact blast furnace gas may have sufficient unreactive gases present to absorb the generated excess heat. I mean, that the carbon, carbon dioxide and the inerts will carry away an appreciable portion of the total heat liberated, thus reducing the cooling requirements. However, it must be recognized that the reaction chamber in which catalysis of CO to $CO_2$ and C is promoted is actually a furnace. In this furnace, carbon black is produced and carried away entrained in the gas, which gas comprises carbon dioxide. The carbon dioxide is recoverable and, in instances where the concentration is high, it pays to recover it for use in making dry ice, liquid carbon dioxide, or a reaction product, as for example an alcohol produced by reaction, the result of which is shown in Equation 15, as follows:

(15) $CO_2 + 3H_2 = CH_3OH + H_2O$ and the heat of reaction can be utilized.

When the cost of hydrocarbons is low and that of coke is high, it is more economical to make the carbon monoxide from the hydrocarbons than by the water gas reaction using the carbon dioxide for other purposes than regeneration of gas; when desired, however, the carbon dioxide can be passed through the generator fuel bed and reconverted into carbon monoxide at high temperature. In this manner the carbon black is actually made from carbon of the generator fuel. The regeneration reaction is:

(16) $CO_2 + C = 2CO$

This is the reverse of reaction 11. My process then comprises the utilization of these reactions under conditions favorable for their occurrence; Equation 11 is a low-temperature reaction whereas Equation 16 depicts a high temperature reaction.

At 1550° F. the reaction shown in Equation 16 occurs about 150 times as fast, left to right, as right to left. At lower temperatures this ratio decreases materially. There is, some tendency for carbon to be formed by this reaction (right to left) at 350 to 450° C. even without the aid of a catalyst. The presence of steam in the reacting gas—along with the carbon monoxide seems to retard the reaction left to right to the extent that its effect is, or may be negligible.

Figure 1 shows in elevation, rather diagrammatically, one form of apparatus in which my invention may be practiced. A portion of the walls of the reaction chamber and carbon black separator are cut away to show the interior in section; a portion of the tuyères are also cut away for the same purpose.

In Figure 1, the reaction chamber 1 is shown with the catalyst 2 in ebullient motion, porous support 3 adjacent the bottom, tuyère 4 for admitting air, steam or cooling fluid such as an inert gas and combinations of them, having an air-supply pipe 5 with control valve 6, steam-supply pipe 7 with control valve 8, and gas-supply pipe 9 with control valve 10; the tuyère 11 for air and gas containing carbon monoxide which gas may be used as fuel gas in initiating the process operation, has an air-supply conduit 12 with control valve 13, and a gas-supply conduit 14 with control valve 15 connected with conduit 16. Aeriform fluids from tuyère 4 are introduced into chamber 1 through pipes 17 and 18 whereas fluids from tuyère 11 are introduced through pipes 19 and 20. Catalyst is admitted to chamber 1 through conduit 21 and valve 22; it is discharged through conduit 23 and valve 24. The gas stream containing carbon black passes out of chamber 1 through offtake 25 and valve 26 leading to the carbon black separator 27 having within baffles 28 and 29 and filter screen 30. The offtake 31 to separator 27, for gases, has a control valve 32; the carbon black is discharged through offtake 33 and valve 34. Other known means of separating or precipitating the carbon black from the gas stream may be substituted for the separating means shown at 27 in Figure 1. Reaction chamber 1 has an outlet 35 for removing dust therefrom with control valve 36, and an element 37 adapted to be heated to a high temperature by virtue of electric current supplied through leads 38 and 39 from any suitable source, for igniting the fuel gas in initiating the operation of the process. Other means obviously may be used for igniting the gas-air mixture in initially heating the catalyst, such as by kindling a fire of solid combustible matter in the space beneath the porous member 3 in chamber 1. The temperature in the catalyst mass is indicated by virtue of the thermocouple 40 and indicator 41.

In view of the disclosure and the drawing one skilled in the art can readily perceive various operating procedures for practicing my invention, however, one method is as follows: Referring to Figure 1, the reaction chamber 1 is charged about two thirds full with the catalyst by opening valve 22, which valve is then closed. Electrical energy from any suitable source is caused to flow as an electric current through the leads 38 and 39, heating element 37 to incandescence. Combustible gas containing carbon monoxide is now introduced by opening valve 15 and then air is admitted to the gas stream by opening valve 13, combustion of the gas is promoted within the chamber 1 until the catalyst mass is heated to the chosen temperature, about 660° Fahrenheit to 800° Fahrenheit in this example. The air supply through valve 13 is discontinued by closing valve 13 and the supply of carbon monoxide through conduit 14 and valve 15 is maintained at a velocity adapted to maintain the catalyst particles in chamber 1 in a state of ebullient motion. The carbon monoxide in passing upwardly through the porous element 3 and in contact with the catalyst 2 in chamber 1 is reacted forming carbon black and the inert gas carbon dioxide both of which are conducted out of chamber 1 through offtake 25 and valve 26 into separator 27 wherein the carbon black is separated from the gas stream which stream is conducted out of 27 through offtake 31 and valve 32 and subsequently cooled and stored in a known manner. The separated carbon black is withdrawn from separator 27 through offtake 33 and valve 34. During the production of carbon black the said temperature is maintained in the catalyst mass. When the concentration of carbon monoxide in the gas stream admitted through valve 15 is high the temperature of the mass may tend to rise in which event inert gas, nitrogen, carbon monoxide, steam or combinations of them are introduced into the reactant stream by opening valve 10 or valve 8 or both. In the event that the temperature of the catalyst mass tends to fall below the chosen level a small amount of air may be admitted into the reactant stream through valve 6 or valve 13. The conditions under which more or less steam is used in the operation of the process is more completely disclosed subsequently in this specification. The gas supplied through valve 15 is preferably preheated to about 250° Fahrenheit; the means for preheating the gas are not new and therefore are not separately shown in Figure 1 but they are shown in my copending application Serial No. 414,710 to which reference has been made. The catalyst 2 may be changed while the process is in operation by withdrawing catalyst through offtake 23 and valve 24 and introducing additional catalyst through conduit 21 and valve 22. The separator 27 has a clean-out door 42 at the top.

It is understood that the gas admitted to chamber 1 through conduit 9 and valve 10 may be any gaseous fluid adapted to function as a cooling fluid or diluent as disclosed elsewhere in this specification. The react fluid comprising carbon monoxide is the gas introduced through conduit 14 and valve 15.

It is apparent that in my process I have, in the products of reaction both carbon and carbon dioxide. These materials react chemically at high temperatures with the reduction of the carbon dioxide to carbon monoxide, but at low temperatures the rate of reaction is so much slower than the formation of carbon from carbon monoxide that I find it possible, by the employment of a catalyst, such as iron, or an iron alloy, or equivalent, and by the proper adjustment of the velocity to obtain substantially complete conversion of CO to carbon and carbon dioxide. The concentration of the components of the initial gas used influence equilibrium. It is not claimed that chemical equilibrium is exceeded in any of the reactions that occur in my process. However, I find that the transposition of carbon monoxide to carbon and carbon dioxide is materially hastened towards equilibrium by a solid catalyst at a low temperature and that by causing the velocity of flow of the reactant gas contacting the catalyst to be high enough, the side reactions can be reduced to a minimum because insufficient time is allowed for them to reach equilibrium. These side reactions can also be controlled to a certain extent by changing the equilibrium conditions, namely, by changing the proportions of the components of which the initial gas is comprised. For example employing steam, hydrogen or both along with the carbon monoxide, various side reactions are controlled.

The reversible reaction, shown by Equation 17 following:

(17) $CO_2 + 2H_2 = C + 2H_2O + 71,600$ B. t. u.

occurs at elevated temperatures from right to left with the absorption of heat, but at temperatures within the range where I propose or prefer to operate—below about 940° F. the rate at which carbon and water unite is slow, and below that temperature the amount of CO and $CO_2$ formed by the water gas reaction would be very small even when steam is caused to contact with the catalyst simultaneously with the carbon monoxide. This is important in that it shows that steam can be used as a cooling agent to prevent overheating of the catalyst. Likewise when both $H_2$ and CO are caused to contact the catalyst the reaction (Equation 13) is very slow at moderately low temperatures. The equilibrium of this reaction has been studied and reported by various investigators and is well understood. However, it is interesting to note that there is a greater tendency for reaction shown in Equation 13, to occur from right to left than from left to right at temperatures below about 700° centigrade, and this is favorable to the production of carbon.

As regards the use of a cooling fluid during processing, steam—(direct steam)—not only has an effect on equilibrium conditions; but it tends to react chemically with carbon monoxide by the equation following:

(18) $CO + H_2O = CO_2 + H_2$ (slightly endothermic).

This reaction is subject to catalysis and at low temperatures the reaction is in the direction left to right. This means that with steam present there is a certain amount of reaction 18 occurring. However, it is possible to maintain such a high velocity of the reactants contacting with the catalyst, particularly when hydrogen is present along with the carbon monoxide and steam that this reaction does not interfere with the production and recovery of carbon black. This effect can probably be explained further by the fact that carbon dioxide and carbon are formed catalytically at so rapid a rate that the $CO_2$ generated influences the equilibrium of reaction 18, retarding the generation of the production of $CO_2$ and $H_2$.

By the proper selection of catalyst, adjustment and control of temperature during reaction, rapid cooling thereafter maintaining optimum rates of flow of reactants contacting the catalyst and by controlling the composition of the initial gas containing carbon monoxide, it is possible to produce carbon black and an effluent gas containing sufficient carbon dioxide to make its recovery from refrigeration and other purposes economical.

By employing reformed gas such as is shown in Equations 1 to 10, or mixed gas containing CO and $H_2$ the products of reaction are largely $CO_2$ and $H_2$ or they may be composed of these two gases almost entirely. It is possible for the gas manufacturer to utilize these products in four ways, namely:

(1) Liquefy, separate the carbon dioxide for use industrially, using the hydrogen mixed with enricher (propane for example) for distribution through gas mains.

(2) Separate the $CO_2$ and return it to the generator for conversion into CO and then circulate through reaction chamber and cause the catalytic formation of carbon and carbon dioxide.

(3) Cause the $CO_2$ and $H_2$ and the CO and $H_2$ in the effluent gas to combine catalytically by virtue of such a catalyst as zinc oxide, zinc chromate or other catalyst known to catalyze the reactions as follows:

$$CO_2 + 2H_2 = CH_3OH$$

$$CO_2 + 3H_2 = CH_3OH + H_2O$$

(4) Pass the reformed gas containing largely $H_2$ and CO into contact with the iron catalyst controlling the conversion of the CO into carbon and $CO_2$ separating the carbon thus formed and enriching the remaining gases, which may contain $CO_2$, $H_2$ and some $CH_4$ and CO, with a suitable enricher such as methane, ethane, propane, butane or other paraffin gas, or with $C_2H_4$, $C_3H_6$, $C_4H_8$, or with mixtures of enricher gases.

In the normal air-blasting of the generator fuel-bed in generating water gas, approximately 1800 cubic feet of air are used per 1000 cubic feet of water gas, made; from this 1800 cubic feet of air about 2000 cubic feet of blast gas is formed containing about 12 to 15 percent of carbon monoxide. Accordingly, at 13 percent, 260 cubic feet of carbon monoxide is produced. From the latter, the theoretical yield of carbon black is 4.1 pounds. This means that even with as low as fifty percent conversion, as much as 2.0 pounds of carbon black can be made per 1000 cubic feet of blue gas produced, from the air-blast gas only which is evolved during one phase of the water-gas process. The importance of this will become evident when it is realized that throughout the country there are numerous places where large volumes of this combustible blast gas is wasted every day in the manufacture of city gas. Furthermore, a method is indicated whereby low grade or fine size fuel for which there is no market, can be gasified, as producer gas or blue water gas or both, and converted into carbon black. Blast furnace gas is also adapted for this purpose. When the carbon monoxide is rather dilute there is less need for attention to the cooling of the catalyst during operation because the temperature equilibrium is reached at about the desired operating temperature.

When generating air-blast gas for the purpose of making carbon black a convenient method of procedure is to introduce into the fuel bed with the air, oxygen or oxygen enriched air, predetermined, proportional amounts of carbon dioxide. The carbon dioxide thus used displaces steam in the ordinary producer gas process. Likewise when it is desirable to increase the CO to $H_2$ ratio in water gas or reformed hydrocarbon gas, carbon dioxide is admitted with the steam or with the steam-gas mixture.

One of the objects of my invention is the flexible operation of a gas-generating unit, and I believe I have accomplished this with my process, for reasons as follows:

(a) A water gas set can be operated to produce carbon black entirely from the generator fuel.

(b) Either the water-gas, air-blast gas or both can be used in making the carbon black.

(c) Hydrocarbon gases can be used in generating the carbon monoxide used for making the black.

(d) During summer months when the demand for dry ice—(carbon dioxide snow)—is great and when the gas-generating equipment or hydrocarbon gases are not required for making city gas they can be advantageously used in the production of carbon black and carbon dioxide snow. On the other hand the gas-generating equipment is available for use during the periods of peak demand for making gas for other use; this is the period when the demand for carbon dioxide and refrigeration is at low ebb.

In making gas containing CO by air-blasting an ignited bed of fuel, I find that, in recovering carbon dioxide, there is a definite amount only of $CO_2$ that should be recirculated that corresponds with the most economical operation. By removing the $CO_2$ from the gas effluent from contacting the iron or other catalyst, and introducing it with the air blast to the fuel bed, the percentage of carbon monoxide first increases and then upon further increments of carbon dioxide the cooling-effect upon the fuel bed is manifested by an increase in the $CO_2$ content of the generated gas. If all of the retrieved $CO_2$ is recirculated a point is reached where the fire is almost extinguished. The economical point in ordinary operation substituting $CO_2$ for steam in producer gas generation is reached when the volume of $CO_2$ used is substantially equal to the volume of steam otherwise required. In my process, operating with recovery of carbon dioxide a new condition arises and the most economical operation requires the introduction of a larger amount of $CO_2$ than the volume of steam required in making producer gas. The minimum percentage of $CO_2$ and the maximum percentage of CO in the generated gas is favorable for maximum recovery of carbon black alone but not for carbon dioxide. An intermediate point, varying with the relative value of carbon black and carbon dioxide is the optimum point.

Making water gas, when the air-blast gas is used separately for recovering carbon and carbon dioxide, it is only economical to circulate $CO_2$ during the water-gas-making run.

When warm gas containing or comprising carbon monoxide is caused to contact a catalyst comprising iron, for example iron borings, carbon black is formed according to Equation 11. With an ordinary stationary bed of iron catalyst, passing the gas through the bed results in a swelling of the iron to more than double its original volume and the deposition of carbon in the mass of catalyst. In order to have uniform conditions in the catalysis of the reaction, I prefer to pass the chosen generator gas initially containing CO through a mass of solid catalyst the particles of which are in a state of turbulent motion by virtue of the velocity of said gas. In other words, I prefer to suspend the catalyst in a stream of the gas, the mass of catalyst being confined in a reaction chamber. One means of thus suspending a catalyst, and the gas velocity conditions attending successful operation have been defined in my application Serial No. 414,710 filed Dec. 17, 1929. Briefly this step includes passing a fluid upwardly through a mass of catalyst at a velocity at least sufficient to cause the whole to assume the properties of a liquid and appear like a boiling liquid, that is, the catalyst particles are substantially in a state of ebullient motion. Although I prefer not to confine myself to the use of a moving catalyst, I find that it is an effective method of producing carbon and of entraining the maximum amount of it in the effluent gas—separating it from the catalyst. This is an important advantage I claim for my process.

Considerably more pressure is required to cause the ebullient motion of particles of a solid catalyst such as iron borings than a catalyst comprising iron or the equivalent as a surface coating of, or as a part of, a less dense material. Catalysts of the latter kind may be used. With some catalysts better results are obtained when a pressure of more than one atmosphere is employed, in fact, in some cases a pressure of many atmospheres may advantageously be used. High pressures are particularly beneficial when the gas containing carbon monoxide is rather dilute and also when certain other gases are present which tend to cause side reactions resulting in an increase in volume of gaseous products; for example, pressure tends to retard reactions such as shown in Equations 13 and 16 left to right whereas it favors reactions indicated by Equations 11, 12 and 17, left to right. Because pressure influences the result of reaction the temperature required at elevated pressure may not be optimum for operation at lower pressure. A gas containing a very high percentage of carbon monoxide generates considerable heat during complete reaction, and when a cooling fluid is introduced directly into the gas stream as a method of maintaining the catalyst at a suitable temperature the effect of the presence of said fluid upon reactions must be considered. An adjustment of temperature and pressure conditions may be required, or at least desired; as evidenced by a study of equilibria of the reactions that may be involved. With substantially straight carbon monoxide, or with carbon monoxide and nitrogen or other inert, the equilibrium between CO and $CO_2$ is the important factor for consideration, and adjustments of temperature and pressure are made to bring about optimum production of carbon black. In this instance the reaction yielding carbon as by Equation 11 is more complete at a given temperature the higher the pressure. However at a given pressure the percentage of carbon monoxide in the effluent products of reaction increases as the temperature rises. The effect upon side reactions when other gases or vapors are present, are, in some cases, quite the opposite; that is, increasing the pressure does not favor the production of side-reaction products but raising the temperature favors such reactions. Therefore for a given gaseous mixture it is desirable to consider the various possible reactions and adjust the temperature and pressure conditions accordingly as well as the space velocity or time of contact of reactants with the catalyst, in order to obtain the optimum yield of carbon black. Usually a temperature of 800° F. is sufficient and at atmospheric pressure this is about the upper limit at which the gas should be caused to react. Above this temperature, at atmospheric pressure appreciable amounts of carbon monoxide appear in the reaction products even at equilibrium. However, it will be obvious that by employing superatmospheric pressure a higher temperature can be used but usually not advantageously using an active catalyst, unless for the purpose of controlling side reactions or unless the time of contact of carbon monoxide with the catalyst is very brief.

Using zinc or copper it is sometimes desirable to employ higher temperatures using a given gas mixture than when using iron catalyst. The catalytic activity of zinc is not appreciable at a low temperature but at elevated temperature it has positive catalytic activity. Zinc melts at 419.5° centigrade, and therefore it is desirable to cause reaction to occur below that temperature (below 787° Fahrenheit) when using zinc in the solid phase as a catalyst. Using this catalyst it is particularly advantageous to employ super-atmospheric pressure in conducting the catalytic reactions.

The characteristics and properties of the carbon black produced from carbon monoxide vary according to changes in a number of factors. Carbon made according to reaction shown by Equation 17 occurs in a very fine state of subdivision, apparently finer than some of the carbons called carbon black and commonly marketed as such. In fact carbon can be made by the reduction of an oxide of carbon, having properties similar to those of carbon black made by a partial combustion of natural gas, such as by the channel process. When excessively high pressure is employed in making carbon black by my process particularly when the concentration of carbon monoxide in the gas used is high, the carbon produced seems to be somewhat more flocculent than that made under lower pressure. When operating under controlled pressure and temperature conditions it is sometimes advantageous to so adjust the temperature and pressure that a certain amount of side reactions occur—reactions such as indicated by Equation 13—for the purpose of producing a carbon readily dispersable in certain fluid mediums. Many carbons are appraised according to their apparent density (weight per unit volume of space occupied). The density is a function of the kind and amount of gas absorbed by the carbon. More gas can be absorbed by carbon the finer the state of subdivision; that is the smaller the average size of the carbon particles. Within certain limits I am able to control the apparent density of carbon black made by my process.

Carbons are sometimes appraised according to the time required to incorporate a given weight of it in a batch mixture of materials being compounded. I find that besides being somewhat dependent upon the apparent specific gravity of the carbon it is also a function of the surface wetting properties of the carbon which in turn depend upon the nature of the absorbed gas or vapor. For use in mixtures that have an oily nature it is sometimes beneficial to introduce into the reactant gas, in the formation of carbon black, a gaseous hydrocarbon such as butane, pentane and similar compounds, or benzene, or other material having the property of being readily miscible with oil. When the carbon is to be used in a mass of material that is not of an oil nature, it is sometimes preferable to introduce water soluble alcohols or ethers, in the gaseous state, into the fluid stream in such a manner that the carbon will absorb appreciable amounts of them. In any case, upon prolonged exposure to air a state of equilibrium is reached, the carbon retaining a definite amount of adsorbed matter, the amount being different for different materials.

Although I claim broadly the effect of passing a gas containing an oxide of carbon into contact with a moving catalyst adapted to catalyze the reaction whereby carbon is produced, I usually prefer to cause said contact by suspending the confined catalyst in a flowing stream of said gas. The catalyst in this instance is not carried along with the stream.

The range of temperature employed by me has been discussed and the conditions under which the limits, particularly the stated upper limit may be exceeded have been designated. The higher the temperature of operation that can be successfully employed, the less the amount of cooling required, and therefore the more efficient the process.

The gaseous raw material containing the oxide of carbon to be converted may be heated, when necessary, by known methods of heat-exchange using the heat generated by the reaction. In working within the range 250° to 550° Fahrenheit, for example, I find that it is not necessary to heat all of the gas to 250° F. prior to its contact with the catalyst.

I do not believe that I have found all of the catalysts that will function in my process; it is believed that many other solids will also function in a similar manner but having various activities. To use such a catalyst it is only a matter of providing the optimum temperature, pressure and space velocity to obtain the desired result. The benefit derived from the use of the catalyst is that equilibrium can be obtained at nominal or atmospheric pressure and at temperatures where equilibrium requires the minimum residue of unreacted materials such as carbon monoxide. Thus the reactions yielding carbon from an oxide of carbon can be conducted substantially at atmospheric temperature when the proper conditions are provided. It has been shown that increasing the pressure on the system has a similar effect on the reduction of carbon monoxide as an increase in temperature within the range below 660 degrees Fahrenheit. It follows that at higher pressures lower temperatures may be used. However, when it is desirable to operate at high temperature for the purpose of preventing certain side reactions or for the purpose of using a particular catalyst less active than iron at the usual temperature—below 800° F.—the employment of super-atmospheric pressure prevents the formation of an amount of CO that would normally be formed when operating at atmospheric pressure.

The carbon black that I am able to produce by the herein described process, namely by the reduction of an oxide of carbon, is different in nature and characteristics from other carbons, so far as I am aware. As generated, it is substantially free from adsorbed oxygen and contains less than 1.0 per cent of tarry extractable matter, as generated. It is readily diffusible throughout liquids and plastic solids, and its surface wetting properties are controlled by the presence in the finished product of selectively adsorbed gases. The average size of the particles appears by the ultra microscope to be comparable with carbon made by the combustion process, being smaller than that of carbon made by the pyrolysis of hydrocarbon compounds. The traces of zinc, when zinc is used in or as catalyst, that appear in the carbon black are beneficial when the carbon is used in the compounding of rubber or linseed oil paints.

An application of my process that may not be clearly evident is the production of peak gas (gas generated when the demand for combustible gas is great) or of a diluent of natural gas, comprising, breaking up a hydrocarbon gas or other carbon-containing gas by reaction with steam, forming chiefly $CH_4$, $H_2$ and CO, converting at least a portion of the CO to carbon and $CO_2$ recovering carbon black, and enriching the resulting gas to a desired calorific standard with or without removing $CO_2$. The air-blast gas may be incorporated in the total make gas (generated water gas or reformed hydrocarbon gas) when desired.

Having described my invention, I claim:

1. A process of making carbon black, comprising, confining an appreciably deep mass of small particles of catalyst of the class comprising a metal and a metal oxide which particles are freely movable with respect to one another, passing a gas stream initially containing carbon monoxide upwardly through said mass at such a velocity that said particles are maintained in a state of ebullient motion, maintaining said mass at a temperature of substantially 300° to 940° F. thereby causing chemical reactions to occur within said mass forming carbon black, and separating the reaction products including said carbon black from said mass as formed.

2. A process of making carbon black, comprising, confining an appreciably deep mass of small particles of catalyst comprising a metal which particles are freely movable with respect to one another, passing a gas stream initially containing carbon monoxide upwardly through said mass at such a velocity that said particles are maintained in a state of ebullient motion, maintaining said mass at a temperature of substantially 300° to 940° F. thereby causing chemical reactions to occur in said stream within said mass forming carbon black, and separating the reaction products including said carbon black from said mass as formed.

3. A process of making carbon black, comprising, confining an appreciably deep mass of small particles of catalyst comprising iron which particles are freely movable with respect to one another, passing a gas stream initially containing carbon monoxide upwardly through said mass at such a velocity that said particles are maintained in a state of ebullient motion, maintaining said mass at a temperature of substantially 300° to 940° F. thereby causing chemical reactions to occur in said stream within said mass forming carbon black, and separating the reaction products including said carbon black from said mass as formed.

4. A process of making carbon black, comprising, passing a stream of a gaseous fluid initially containing carbon monoxide upwardly through a confined mass of considerable depth of solid catalyst adapted to catalyze the reaction $2CO=C+CO_2$, maintaining said mass at a temperature favorable for the reaction to occur, maintaining the particles of said confined mass of catalyst in a state of ebullient motion by virtue of the velocity of said stream, causing chemical reactions to occur in said stream within said mass forming said carbon black, and separating the reaction products including said carbon black from said catalyst substantially as formed.

5. A process of making carbon black, comprising, passing a stream of gaseous fluid initially containing carbon monoxide upwardly through a confined mass of solid catalyst of considerable thickness which catalyst is adapted to catalyze the reaction $2CO=C+CO_2$, maintaining said mass at a temperature favorable for said reaction to occur but below about 940° Fahrenheit, maintaining the particles of said catalyst in a state of ebullient motion by virtue of the velocity of said stream, thereby producing said carbon black, and separating the reaction products including said carbon black from said catalyst substantially as formed.

6. A process of making carbon black, comprising, passing a gas stream initially containing carbon monoxide upwardly through a confined mass of solid catalyst of considerable depth which catalyst is adapted to catalyze the reaction $2CO=C+CO_2$ within the temperature range 300° to 940° Fahrenheit, maintaining the particles of said mass of catalyst in a state of ebullient motion by virtue of the velocity of said stream, maintaining the temperature of said mass within said temperature range thereby producing said carbon black, and separating the reaction products including said carbon black from said catalyst substantially as formed.

7. A process of making carbon black, comprising, confining an appreciably deep mass of small particles of solid catalyst adapted to catalyze the reaction $2CO=C+CO_2$, heating said mass to a temperature approximating 660° to 800° Fahrenheit, passing upwardly through the heated mass at a high velocity a gaseous stream containing so much carbon monoxide that more heat is generated within said mass than is removed in said stream as sensible heat of the products of said reaction, meanwhile maintaining the particles of said confined mass in a state of ebullient motion by virtue of said high stream velocity, maintaining said mass at said temperature by introducing into it along with said stream a sufficient amount of a cooling fluid of the group consisting of steam and an inert gas, thereby forming said carbon black, and separating the reaction products including said carbon black from said catalyst substantially as formed.

WILLIAM W. ODELL.